Aug. 12, 1941.   B. HAHN   2,252,504
METHOD OF MOUNTING LENSES IN ILLUMINATED SIGNS, ETC
Filed July 24, 1939

Inventor
Bernard Hahn
By
Attorneys

Patented Aug. 12, 1941

2,252,504

UNITED STATES PATENT OFFICE 2,252,504

METHOD OF MOUNTING LENSES IN ILLUMINATED SIGNS, ETC.

Bernard Hahn, Muscatine, Iowa, assignor to Automatic Button Company, Muscatine, Iowa, a corporation of Iowa Application July 24, 1939, Serial No. 286,265

9 Claims. (Cl. 18—59)

This invention relates to illuminated signs and the like, and one object thereof is to provide novel methods of mounting lenses formed from transparent phenol-formaldehyde and/or other colored or uncolored synthetic resinous materials, in holes in the faces of signs or the like to form letters and/or characters; whereby the lenses may be readily mounted without requiring the use of clips, springs, or other extraneous fasteners to hold same in place in their respective holes in the signs, said lenses being retained therein merely by expansion of the resinous material while changing over from heat unstable into heat stable condition.

Other objects are to provide a novel method of making lenses of said synthetic resinous materials adapted for use in such signs; also to provide novel lenses therefor.

My invention involves the use of resinous materials, such as phenol-formaldehyde or other synthetic resinous materials, which are thermoplastic throughout a considerable temperature range, but which may exist either in a heat stable condition in which all the internal elastic forces therein are in equilibrium and in which condition the resin will not change its shape, upon application of heat, until sufficient heat is applied to actually melt same; or the resinous material may be in a heat unstable condition in which all the elastic forces therein are not in equilibrium but are merely held in the material while the resin is at a temperature below the heat distortion point. From said heat unstable condition, the resin will, upon application of heat above the heat distortion point, again revert into the shape it formerly assumed while in a heat stable condition.

One novel method according to my invention involves the steps of (1) forming the resinous material, such as transparent phenol-formaldehyde and/or other colored or uncolored synthetic resins into a heat stable blank of desired lens shape, and then (2) changing the blank over from its heat stable into heat unstable condition by reducing, under compression and heat treatment, at least a portion of such lens blank to such smaller diameter that the reduced portion thereof will enter a preformed hole in the sign of smaller diameter or size than the normal diameter or size of the blank when in its heat stable shape; then (3) chilling or "freezing" the heat unstable blank while so distorted so that the blank will retain its heat unstable shape at normal temperatures, and subsequently, (4) after insertion of the blank in the hole, causing the blank to re-assume its normal heat stable shape by application of heat, thereby utilizing the elastic properties of the resinous material to cause the blank to expand and lock itself in the hole in the sign while changing over from heat unstable into heat stable condition.

Another novel method, according to my invention, is to perform the steps (1) and (2) above described, and then, instead of performing the chilling or "freezing" step (3), to immediately insert the heat unstable blank while still hot into the hole in the sign and allowing same to expand in said hole while reverting into its heat stable shape during the process of cooling, the expansion taking place, (with or without the application of heat) because of the retention of heat in the blank acquired during step (2) above.

I will explain the invention with reference to the accompanying drawing which illustrates several practical embodiments thereof to enable others familiar with the art to adopt and use the same; and will summarize in the claims the essential features of the invention for which protection is desired.

Figure 12:
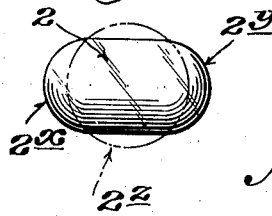
Figure 13:
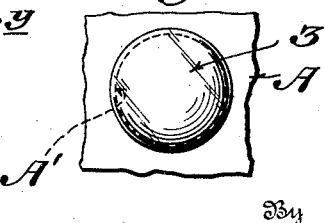

Figs. 12 and 13 also illustrate the invention as applied to the whole of a spherical shaped lens blank.

Figure 1:
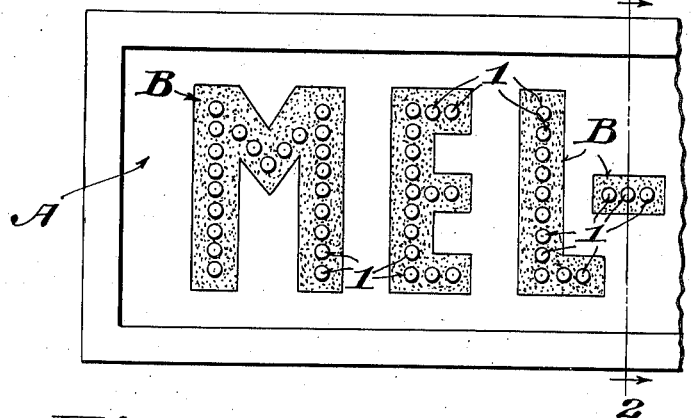
Fig. 1 is an elevation of part of the front face of a conventional sign, bearing letters or characters in which are mounted by my novel method rows of lenses to outline the same.
Figure 2:
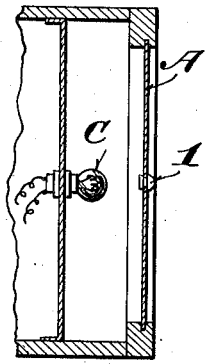
Fig. 2 is a transverse section on the line 2—2, Fig. 1.

In Figs. 1 and 2 the reference character A indicates a conventional sign face having letters or characters B displayed thereon, usually by painting, while the numerals 1 indicate lenses inserted in preformed holes to outline or conform with the lettering B of the sign. The letter C indicates an incandescent lamp used to illuminate the sign from the interior in the usual manner, the same emitting light rays which pass directly through the lenses 1; however fluorescent tube lamps have been found very effective for illumination of signs containing my lenses, and still other methods of illumination may be used, the particular method of illumination forming no part of my present invention.

Figure 3:
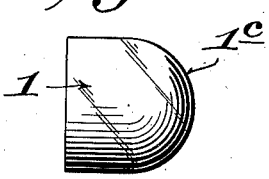
Figs. 3 and 4 are enlarged side and end elevations respectively of a lens blank in normal heat stable condition, such as used in the sign shown in Figs. 1 and 2.
Figure 4:
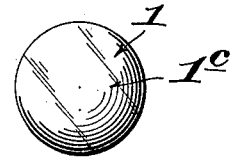
Figure 5:
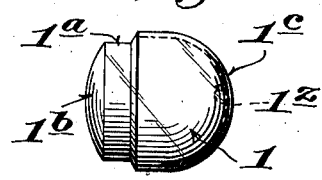
Figs. 5 and 6 are side and end elevations of the lens blank shown in Figs. 3 and 4 when deformed under heat and pressure into desired heat unstable shape and then "frozen" so that it will retain such shape until inserted into the hole provided therefor in the sign face.
Figure 6:
Figure 7:
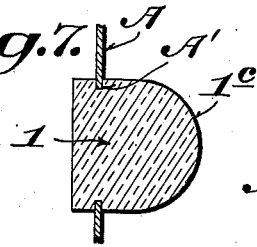
Fig. 7 is a vertical section through the sign face taken at the lens, and showing the shape of the lens blank shown in Figs. 5 and 6 after insertion into the hole in the sign face, and after subsequent heat treatment to restore the blank into its heat stable shape shown in Figs. 3 and 4.
Figure 8:
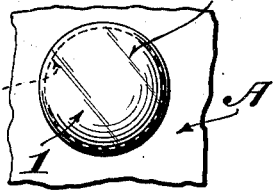
Fig. 8 is a plan view of the lens and adjacent portion of the sign face, shown in Fig. 7.

Figs. 3-8 illustrate one method of shaping a blank for a sign lens 1 formed of phenol-formaldehyde and/or other transparent synthetic resinous materials, whether colored or uncolored, and locking it in position in the sign face. Figs. 3-4 show the normal shape of the blank in its heat stable condition used in the sign shown in Figs. 1-2, in which condition all the internal forces within the resinous mass are in equilibrium. Figs. 5-6 show the form and shape imparted to the blank in its heat unstable condition as result of the first step in the method wherein a reduced cylindrical portion 1a is formed at the rear end portion of the blank by compression and under heat treatment. The bulge 1b at the rear end of the blank is caused by displacement of material from the reduced portion 1a; also the substantially semi-spherical head 1c of the blank has been somewhat increased in size, over the normal size, indicated by the dot and dash line 1z, due to displacement of material from reduced portion 1a. The heat unstable blank shown in Figs. 5-6 is then cooled or chilled to "freeze" same in its heat unstable shape (shown in Figs. 5-6) in which the internal forces are not in equilibrium but are merely held in the mass, and in which shape the reduced portion 1a will enter the hole A' provided therefor in the sign face A. Subsequently the heat unstable blank (Figs. 5-6) is inserted into hole A' and expanded into locked position as shown in Figs. 7-8, this being accomplished by expansion of the inserted blank by the application of heat whereby the same again assumes its original heat stable shape, shown in Figs. 3-4, as far as the thickness of the sign face A will permit. The parts 1a, 1b of the blank which were distorted by compression (Figs. 5-6) will be found to return to substantially their original shape, and the blank 1 will be securely locked into position in the sign face as the hole A' is somewhat smaller than the normal diameter of blank 1 when in heat stable condition.

Figure 9:
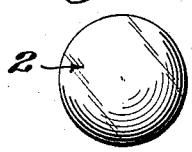
Figs. 9, 10 and 11 illustrate the invention as applied to a portion of a spherical shaped lens blank.
Figure 10:
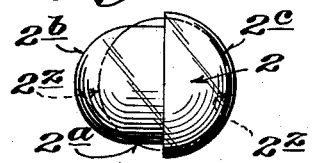
Figure 11:
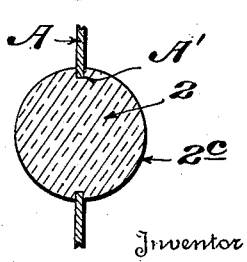

Figs. 9-10-11 illustrate the method as applied to a portion only of a spherical or ball-shaped lens blank. Fig. 9 indicates a ball or spherical shaped lens 2 in its normal heat stable condition. Fig. 10 shows a cylindrical portion 2a formed coextensively with a radius of the blank, under compression under heat, said cylindrical portion 2a being of size to fit within the hole A' of sign face A. The bulge 2b is caused by displacement of the material from portion 2a, the normal size of blank 2 being indicated in dot and dash lines 2z, and the semi-spherical head 2c of blank 2 (Fig. 10) is also somewhat increased in size due to displacement of material from reduced portion 2a. The blank in its heat unstable shape indicated in Fig. 10 is then chilled or "frozen" so that it will retain such shape until again subjected to heat treatment. Fig. 11 shows a section through the metal sign A into the hole A' of which the heat unstable form, shown in Fig. 10, has been inserted and thereafter heat has been applied to the blank 2 to cause same to assume its heat stable spherical shape shown in Fig. 9, the blank becoming locked in the hole A' by the closing-in of the material against the faces of the sign adjacent hole A' as the reduced end 2a expands.

Figs. 12 and 13 also illustrate the method as applied to a spherical lens such as shown in Fig. 9. Fig. 12 shows the blank 2 reduced under compression and heat into a substantially cylindrical shape in which heat unstable condition same will fit within the hole A' of sign A, the reference numerals 2x and 2y indicating the bulges at the end of the cylindrical shape caused by displacement of the material in the body indicated by the dot and dash line 2z. When the heat unstable blank (Fig. 12) is inserted into the hole A' of the sign, and when heat is applied, the blank will again assume its spherical heat stable shape and lock itself by expansion within the hole A' in the sign face, as hereinbefore described and as shown in Fig. 13.

The several modifications merely illustrate that different shapes of lens may be used in connection with my novel attaching or mounting method, provided the lenses are made of suitable resinous material; and further indicate that my method is not limited to any particular shape or size of blank, and that my method of mechanically compressing the blanks under heat treatment and subsequently freezing the compressed blanks into heat unstable shape, for subsequent use and expansion with application of heat, can be applied to any size or shape of sign lens made of said thermo-plastic resinous materials.

My method of attaching or mounting illuminating sign lenses, made of transparent phenol-formaldehyde and/or other transparent synthetic resinous materials, in clear and various colors, to form designs, letters, numerals, and/or characters by this process is new and novel; and these above mentioned plastic lens blanks can be reduced to a smaller dimension and/or diameter and/or changed to different shapes by the application of pressure when heated, and same will remain "frozen" until heat is again applied whereupon the lens blanks will assume their original sizes and/or shapes, if unconfined.

The step in the process of chilling or "freezing" the blank may, however, be entirely omitted according to a modified process which involves the steps of (1) compressing a normal heat stable blank while heated into the desired size and shape of the hole in the sign, using a suitable heating and compressing tool on the job, to change the blank into a heat unstable condition; and then (2) inserting said compressed heat unstable blank into the preformed hole in the sign while still hot or heated from the first operation, permitting the blank to again change over into heat stable condition, with or without application of heat at that time, which expansion will take place because of the retention of heat in the blank acquired during the first step above mentioned.

Of the two methods herein described, the first method would permit the lens blanks to be shipped ready for use in their desired heat unstable shape and condition, for direct insertion in the holes in the sign by the sign builder, thus precluding the necessity on the part of the sign builder of having to heat and compress the lens blanks. This permits the storage and/or shipment of sign lens in heat unstable condition for sign builders' use, the blanks being ready for insertion directly into preformed holes in the sign by sign builder. The second method, however, would permit shipping the lens blanks in normal heat stable shape and condition without being heated and compressed beforehand into heat unstable shape, which operation of heating and compressing will be performed by the sign builder, who immediately following this operation inserts the lens blanks into the holes in the sign, permitting the blanks to expand due to the heat which is retained therein or carried over from the first operation.

I claim:

1. The herein described method of mounting lenses of thermo-plastic resinous material, adapted to exist in either heat stable or heat unstable condition, in apertures in sign faces or the like; consisting in heating and compressing at least a portion of a heat stable lens blank of such material of normally larger size than the aperture into a heat unstable blank of such size and shape as will enter said aperture, then chilling the heat unstable blank so that same will retain its compressed size and shape until re-heated; then placing the compressed portion of the chilled blank within said aperture, re-heating the same to cause the blank to again expand to substantially its original heat stable size and shape, and permitting said blank to cool.

2. In a method as set forth in claim 1, said reduction being formed in one end portion of the blank.

3. In a method as set forth in claim 1, said blank being elongated, and said reduction being formed throughout the entire length of the blank.

4. The herein described method of mounting lenses of thermo-plastic resinous material, adapted to exist in either heat stable or heat unstable condition, in apertures in sign faces or the like; consisting in forming a lens blank of such material into desired heat stable shape of normally larger size than the aperture; heating and compressing at least a portion of said blank into a heat unstable blank of such size and shape as will enter said aperture; then immediately placing the compressed portion of the heated blank within said aperture and permitting the blank to cool whereby the heat imparted to said blank during the compressing operation causes said blank to expand to substantially its original heat stable size and shape, and upon cooling said blank locks itself in said aperture.

5. In a method as set forth in claim 4, said reduction being formed in one end portion of the blank.

6. In a method as set forth in claim 4, said blanks being elongated, and said reduction being formed throughout the entire length of the blank.

7. The herein described method of mounting lenses of thermo-plastic resinous material, adapted to exist in either heat stable or heat unstable conditions, in apertures in sign faces or the like; consisting in heating and compressing at least a portion of a heat stable lens blank of such material of normally larger size than the aperture into a heat unstable blank of such size and shape as will enter said aperture; then placing the compressed portion of the heat unstable blank within said aperture and maintaining the blank in said aperture at a temperature sufficiently high to cause the blank to expand to substantially its original heat stable size and shape, and thereafter permitting the blank to cool.

8. In a method as set forth in claim 7, said reduction being formed in one end portion of the blank.

9. In a method as set forth in claim 7, said blanks being elongated, and said reduction being formed throughout the entire length of the blank.

BERNARD HAHN.